3,177,126
PROCESS AND APPARATUS FOR PURIFYING SOLVENTS, MORE ESPECIALLY FOR THE DRY CLEANING INDUSTRY
Paul Auguste Joseph Charreau, 23 Rue des Chapliers, Lannion, Cotes-du-Nord, France
Filed Sept. 28, 1959, Ser. No. 842,932
Claims priority, application France, Oct. 3, 1958, 775,857
7 Claims. (Cl. 202—48)

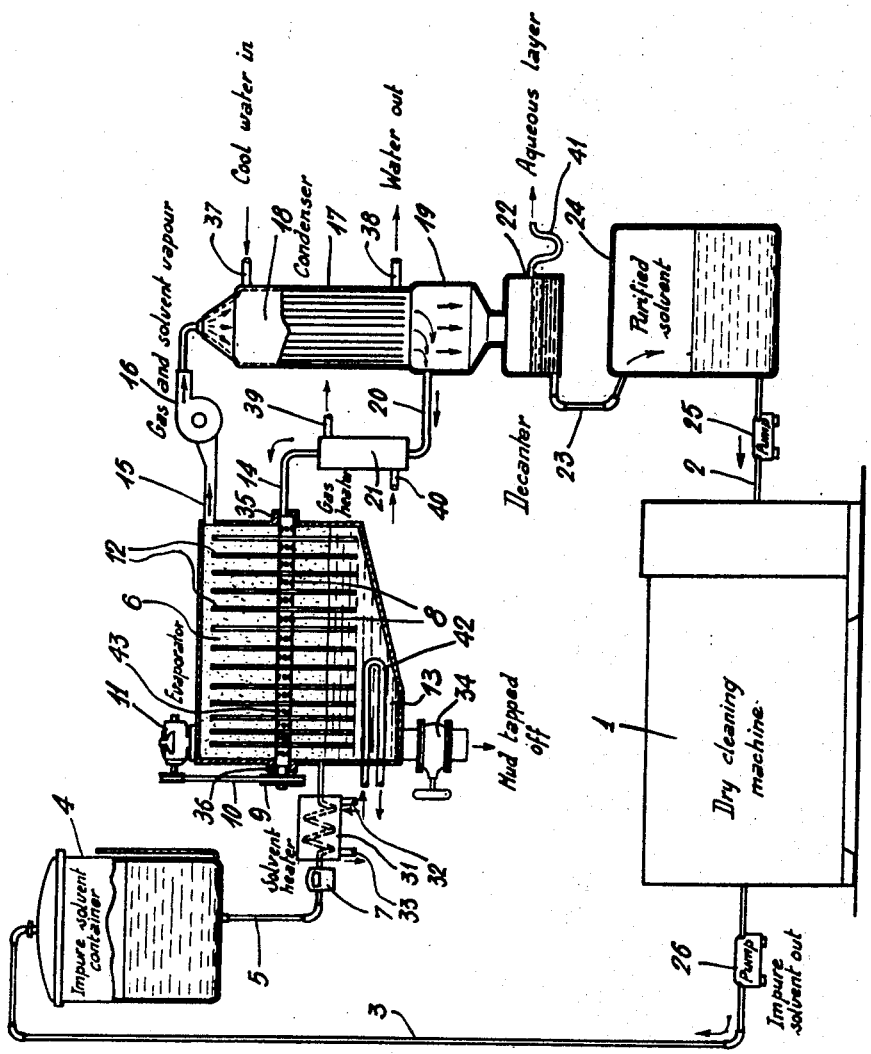

In small and large dry cleaning establishments, it is traditional to regenerate the solvents by filtration through such filter means as metal cloth, cotton or nylon in order to free them from insoluble impurities, followed by distillation at boiling temperature and recovery of the distillate.

Distillation is a slow and costly operation, which in addition modifies the properties of certain solvents, more especially by reason of the chemical action of certain impurities or due to polymerisation effects. For example, in the case of perchloroethylene, the solvent mass must be brought to a temperature of 119° C., and maintained at this temperature. Since, in order to ensure a good heat exchange and a regular supply of heat, the distillation vessel is generally heated, not by a flame, but by means of a coil through which a heating fluid is passed, it is then necessary to have available steam under pressure or to employ a special heating fluid.

It is an object of the present invention to obviate the disadvantages of the conventional processes and apparatus for the regeneration of solvents such as are employed in dry cleaning, more particularly solvents containing a waterproofing silicone. A further object is to provide a simpler and less costly apparatus which is cheaper to construct and to maintain, and in which the solvent may be controlled in the course of its recovery, notably by reason of the fact that it operates at lower temperature.

In accordance with one feature of the invention, the solvent to be purified, while being given a larger free surface, is subjected to evaporation at a temperature substantially below its boiling point in an atmosphere swept by a hot inert gas, and the mixture of gas and vapours is cooled and the solvent recovered in the liquid state.

The solvent is preferably a compound or a mixture of compounds of the class of hydrocarbons and chlorinated hydrocarbons which are employed or have been proposed for dry cleaning. Typical solvents are trichloroethylene (B.P. 87° C.), perchloroethylene (B.P. 119° C.), carbon tetrachloride (B.P. 76° C.), o-dichlorobenzene (B.P. 175° C.), benzene (B.P. 80° C.), toluene (B.P. 111° C.), m-xylene (B.P. 139° C.), solvent naphtha (B.P. 120-165° C.), a light petroleum fraction (B.P. 85-160° C.), white spirits and notably that having a boiling range of 130-175° C., and the variety having a higher boiling range known under the name "Dilutine." Perchloroethylene and trichloroethylene, which are very effective for dry cleaning are of outstanding interest, particularly as representative of the class of nonflammable solvents, or solvents which are flammable only with difficulty.

Generally speaking, the evaporation is carried out at a temperature of the order of 50° to 90° C., the working temperature in this range increasing with increase in the boiling point of the selected solvent.

Preferably, solvent may be admitted, in manner such that it presents a large surface, into a closed vessel receiving the inert gas at the temperature selected for causing the evaporation, if desired without any supply of heat to the solvent other than by way of the gas, the mixture of gas and vapours may be discharged from the said enclosed vessel, the solvents may be separated therefrom by cooling, and the gas thus freed from the greater part of solvent may then be heated and returned into the closed vessel. In any event the gas temperature and rate of flow are so controlled that the solvent is evaporated at a temperature below the boiling point thereof.

It is thus possible to operate continuously, the regenerated solvent being returned to the cleaning plant while the residual solids, or muds are continuously or periodically extracted from the evaporator.

A very appreciable advantage in all cases is that filters and distillation vessels are dispensed with.

In order that the surface of the solvent may be as large as possible during the evaporation, the solvent may be subdivided in the sense of being admitted in droplets, more especially into the current of hot gas, or it may be caused to trickle into contact with this gas and the contact surface constantly renewed by means of a mechanical agitating device.

It has been found that it is particularly effective and convenient, for the purpose of facilitating the separating of solids, to spread the solvent in thin sheets by means of vertical or inclined discs which are immersed at their lower portion in a body of the solvent to be purified and carry along a film thereof on each of their faces, in contact with hot gas travelling between the said discs. The impurities can thus collect in the relatively quiescent zone situated below the discs, at some distance from the lattter, at the bottom of the body of solvent.

In practice, when the liquid solvent is admitted in droplets into the current of hot gas or is caused to trickle into said current of hot gas, notably by spreading it in thin sheets, it is preferable to bring the liquid solvent to a temperature substantially equal to that at which the vapours are to escape and to bring the hot gas to a somewhat higher temperature. Thus, where discs are used, the body of solvent into which the discs dip can be heated by indirect heat exchange with a heating fluid (by, for example, a submerged coil).

The process and the apparatus according to the invention afford the advantage of facilitating the use, in conjunction with a solvent medium, of silicones (for example, the product sold under the name "Rhodorsil"), the use of which for the treatment of textiles during their cleaning has been proposed. The presence of such substances in very small proportions in the solvent to be purified in fact results in an unavoidable production of foam in a distillation vessel as soon as the temperature approaches the boiling point of the solvent, and persistent foams then enter the condenser and cause an interruption of the distillation. This disadvantage which also may occur in the absence of silicon by reason of residual soap, finish, resist or the like in fabrics subjected to dry cleaning is obviated when operating at relatively low temperature in accordance with the invention, which thus affords an advance in dry cleaning with the aid of silicones.

Waterproofing silicones are more particularly those described in the work "Silicones and Their Uses" by Rob Roy MacGregor (McGraw-Hill, Publishers, New York), and in the present instance organopolysiloxanes, inter alia dimethylpolysiloxanes comprising the characteristic group:

and methyl hydrogenopolysiloxanes comprising the characteristic group:

in the presence or absence of catalysts, which silicones may be polymerised at temperatures ranging from ambient temperature to more than 100° C. Particularly recommended compositions are mixtures of dimethylpolysiloxane resins, dimethylpolysiloxane "fluids" and alkyl titanates (catalysts) or solutions thereof in a hydrocarbon or in a chlorinated hydrocarbon of the type hereinbefore described as cleaning solvent, more especially butyl titanate. Compositions of this type are described in French Patents Nos. 1,054,423 and 1,049,930, both in the name of Union Chimique Belge S.A. A suitable composition is that marketed by the Company Rhone-Poulenc under the name "Rhodorsil Hydrofugeant 85 GY." In the case under consideration, which concerns the waterproofing of fabrics during dry cleaning, use is made more especially of compositions based on polysiloxanes which polymerise fairly rapidly, and therefore preferably those which polymerise between 40° and 180° C., more especially above 100° C. in each particular case. The temperature must not exceed the lower of the two following temperatures: decomposition point (if any) of the solvent (140° C. in the case of perchloroethylene) and the point at which the textile material to be waterproofed is impaired by heating.

The quantity of these waterproofing silicones employed during combined waterproofing and dry cleaning is preferably such that, after centrifuging of the textile articles, they retain a residual quantity of from 20 to 30 g. of pure silicone per kg. of textile, namely from 2% to 3% by weight.

The waterproofing silicone is added, for example in the form of a so-called "fluid," to the dry cleaning solvent and some of it therefore remains in the contaminated solvent which is extracted from the zone in which the textile articles are cleaned. If this contaminated solvent is brought to its boiling temperature in order to be regenerated, the presence of silicone causes an unavoidable production of foam, as hereinbefore stated.

According to the invention, this effect, which has heretofore prevented the use of waterproofing silicone during cleaning, is avoided by evaporating the solvent at a temperature distinctly below its boiling point. In practice, by reason more especially of the fact that many industrial solvents are not absolutely pure and start to boil below the theoretical boiling point, the evaporation is carried out at a temperature which, measured in degrees centigrade, is from 20% to 50% and preferably about 30% below the theoretical boiling point of the solvent. Thus, in the case of perchloroethylene, the evaporation is carried out between 60° and 95° C., temperatures in the neighbourhood of 80° C. being preferred.

It is to a temperature in this range that it is desirable to bring the solvent in the liquid state in order to evaporate it. It is then brought into contact, preferably over a large surface (drops or thin sheets), with a current of hot inert gas, such as nitrogen or more simply air where a nonflammable or substantially nonflammable solvent is employed at a temperature at least as high and preferably somewhat higher. Thus, in the case of perchloroethylene brought to the neighbourhood of the optimum temperature, the hot air may with advantage be at a temperature of from 80° to 140° C.

The rate of flow of the gas current may vary considerably, for example, from 50 cubic metres per hour to 3,000 cubic metres per hour and preferably from 100 to 1000 cubic metres per hour for the evaporation of a bath of 300 litres of solvent. In any event the rate of flow of the gas stream and the temperature of the gas are so controlled as to prevent the solvent from boiling.

With the foregoing and other objects in view, the invention comprises the novel arrangement and combination of parts hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which the sole figure is a diagrammatic showing of a dry cleaning plant with solvent recovery according to this invention.

Referring to the drawing, there is shown a dry cleaning machine 1 which may be of any suitable type and has an inlet 2 for supplying fresh solvent and a pipe 3 for removal of used solvent. The solvent may be, for example, a hydrocarbon, or hydrocarbon mixture, or preferably a chlorinated or mixture of chlorinated hydrocarbons; a silicone may be present in the solvent.

Pipe 3 leads to a used or contaminated solvent container 4 which communicates through a pipe 5 with an evaporating chamber 6. Interposed in the pipe 5 there is an automatically controlled valve 7 which provides chamber 6 with used solvent from container 4 as soon as the level of the solvent body 13 in said chamber has sunk below a predetermined plane. Pipe 5 as shown preferably passes through a heat exchanger or solvent heater 31 into which a heating medium is supplied through a pipe 32 and from which it is discharged through a pipe 33.

As shown, the evaporating chamber 6 may have a bottom in hopper shape with a valved, mud withdrawing duct 34 in the lower part thereof. Fitted in opposite walls of the evaporating chamber 6 are bearings 35, 36 for a hollow rotary shaft 8 having a pulley 9 on the outer part thereof, coupled through an endless belt 10 with the shaft of an electric motor 11 supported on casing 6. Spaced apart on hollow shaft 8 are discs 12 the lower portions of which dip in the solvent body 13 in chamber 6. The hollow shaft 8 is connected at an end thereof with a pipe 14 for the supply of a hot inert gas, for example hot air where the solvent is perchloroethylene or trichloroethylene or another substantially noninflammable dry cleaning solvent, and it is perforated over peripheral zones 43 along the length thereof, between discs 12 and on either side of the extreme discs, so as to distribute hot gas in chamber 6.

Starting from the upper part of chamber 6 is a pipe 15 leading to a suction fan 16 which forces the gas and vapour mixture into the top portion of a condenser 17 comprising a cooling tube bundle 18; a cooling fluid such as water is supplied to condenser 17 through a pipe 37 and withdrawn therefrom through a pipe 38. In the bottom portion 19 of condenser 17, gas separates from condensed solvent and via a pipe 20 is forwarded to a gas heater 21, thence into a pipe 14; a heating fluid such as steam is supplied to heater 21 through a pipe 39 and withdrawn therefrom through a pipe 40. Below the bottom portion 19 is a liquid solvent collecting vessel 22 connected through a pipe 23 with a purified solvent container 24. Preferably as shown vessel 22 is arranged to operate as a decanter, because the fabrics as subjected to dry cleaning in machine 1 generally contain moisture so that eventually a little water is condensed together with the solvent and, where the solvent has a higher specific gravity than water, settles into a supernatant layer in the relatively quiescent zone provided in vessel 22. For the purpose of discarding the water layer, the vessel is provided with a draw-off pipe 41 at the upper part thereof while pipe 23 starts from the lower part as shown. A pump 25 is provided in pipe 2 for withdrawing regenerated solvent from container 24 and delivering the same to dry cleaning machine 1, while a pump 26 in pipe 3 forces solvent 10 be purified to container 4.

As shown, the chamber preferably contains means for heating the body of solvent 13 without causing turbulence therein, such as a heating pipe 42 immersed in said body below discs 12.

The various component parts of the plant are supported on a common frame (not shown).

The heating of the inert gas in heater 21 and the solvent 13 are controlled and correlated with the rate of flow of inert gas through the cycle including the upper portion of evaporating casing, condensing zone in condenser 17 and heating zone in gas heater 21 so that in neither place is the solvent heated to the boiling point thereof. The velocity of rotation of shaft 8 and discs 12 is regulated so as to effectively lift solvent films from the surface of the solvent body without excessive mechanical agitation, thereby avoiding the production of foam on the solvent body; also, preferably, it should not be great enough to cause the films to be thrown off of the discs as solvent droplets by centrifugal force. Suitable velocities may be easily determined by experiment in each specific case; as an example a velocity of from 40 to 80 revolutions per minute was found satisfactory with discs having a diameter of 60 centimetres.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A process for purifying an unfiltered impure, dry cleaning solvent which is laden with impurities as a result of a dry cleaning operation and may additionally contain a waterproofing silicone, which process comprises:
   (a) cycling an uncondensable inert gas through a cycle including in sequence the upper portion of an evaporating zone which contains a body of a liquid solvent to be purified in the lower portion thereof, a condensing zone and a heating zone;
   (b) supplying solvent to be purified to said body;
   (c) mechanically lifting a plurality of solvent films from the surface of said solvent body into said upper portion of said evaporating zone at a rate which is slow enough to prevent said films to be torn off into droplets and to prevent mechanical production of foam, so as to expose said films to the gas draft through said upper portion of said evaporating zone and cause solvent vapour produced from said films to be carried by and with said gas draft as a mixture, from said upper portion of said evaporating zone to said condensing zone;
   (d) controlling the gas heating in said heating zone and the rate of flow of said gas through said cycle to cause solvent in said films to evaporate at a temperature of the range of 50–90° C. which lies below the theoretical boiling point thereof, measured in degrees centigrade, by no more than 50 percent; and
   (e) cooling said gas and vapour mixture in said condensing zone to a temperature below said film evaporating temperature, so as to cause solvent vapour from said mixture to separate as a liquid phase.

2. The process of claim 1, which further comprises heating said solvent body to a temperature which measured in degrees centigrade lies below the theoretical boiling point of said solvent by no more than 50 percent.

3. The process of claim 1, said film evaporation temperature measured in degrees centigrade lying by no more than 50 percent, not less than 20 percent, below the theoretical boiling point of said solvent.

4. The process of claim 3, which further comprises passing a heating fluid through said solvent body in indirect heat exchange relationship therewith, and controlling the temperature and rate of passage of said heating fluid to maintain said solvent body at a temperature of the range 50–90° C. which lies by no more than 50 percent not less than 20 percent, below the theoretical boiling point of said solvent measured in degrees centigrade.

5. The process of claim 1, said solvent being a substantially inflammable chlorinated hydrocarbon solvent, and said inert gas being air.

6. A continuous process for purifying a dry cleaning solvent which may contain a waterproofing silicon and is withdrawn laden with impurities from a place where such solvent has been employed, which comprises:
   (a) cycling an uncondensable inert gas through a cycle including in sequence the upper portion of an evaporating zone which contains a body of a liquid solvent to be purified in the lower portion thereof, a condensing zone and a heating zone;
   (b) mechanically lifting a plurality of solvent films from the surface of said solvent body into said upper portion of said evaporating zone at a rate which is slow enough to prevent said films to be torn off into droplets and to prevent mechanical production of foam, so as to expose said films to the gas draft through said upper portion of said evaporating zone and cause solvent vapour produced from said films to be carried by and with said gas draft as a mixture, from said upper portion of said evaporating zone to said condensing zone;
   (c) controlling the gas heating in said heating zone and the rate of flow of said gas through said cycle to cause solvent in said films to evaporate at a temperature of the range 50–90° C. which lies below the theoretical boiling point thereof, measured in degrees centigrade, by no more than 50 percent;
   (d) cooling said gas and vapour mixture in said condensing zone to a temperature below said film evaporating temperature, so as to cause solvent vapour from said mixture to separate as a liquid phase;
   (e) returning solvent from said liquid phase to said place;
   (f) supplying solvent laden with impurities from said place to said body in proportion to the return of solvent from said liquid phase to said place; and
   (g) tapping off impurities from the relatively quiescent bottom of said body.

7. A process for purifying an unfiltered dry cleaning solvent which is laden with impurities as a result of a dry cleaning operation and may additionally contain a waterproofing silicone, which process comprises:
   (a) filming said unfiltered solvent to be purified in an evaporating zone under gentle enough conditions to prevent mechanical production of foam and film droplets;
   (b) passing a hot uncondensable inert gas draft through said evaporating zone to lick said filmed solvent and cause the same to evaporate at least partly into said gas draft and lade the same with solvent vapour, leaving any solvent remainder and said impurities in said evaporating zone;
   (c) controlling the temperature and rate of flow of said gas draft to cause said filmed solvent to evaporate at a temperature which is selected from the range 50–90° C. and lies below the boiling point of said solvent;
   (d) passing said gas draft laden with solvent vapour from said evaporating zone to a condensing zone; and
   (e) cooling said gas draft in said condensing zone to a temperature below the first-named temperature to cause said solvent vapour to condense into a purified solvent liquid phase.

References Cited by the Examiner
UNITED STATES PATENTS

| | | | |
|---|---|---|---|
| 1,493,756 | 5/24 | La Bour | 202—49 X |
| 1,544,130 | 6/25 | Christensen. | |
| 1,546,345 | 7/25 | Laird | 202—45 |
| 1,921,850 | 8/33 | Voorhees | 202—236 |
| 2,018,049 | 10/35 | Allen | 202—49 X |
| 2,140,623 | 12/38 | Hetzer | 68—19.0 |
| 2,427,718 | 9/47 | Denys | 202—49 X |
| 2,698,287 | 12/54 | Bowden | 202—236 |
| 2,778,782 | 1/57 | Stuz | 202—64 |
| 2,887,354 | 5/59 | Lichtenstein et al. | 68—24 |

NORMAN YUDKOFF, Primary Examiner.

RICHARD D. NEVIUS, MILTON STERMAN, GEORGE D. MITCHELL, Examiners.